UNITED STATES PATENT OFFICE.

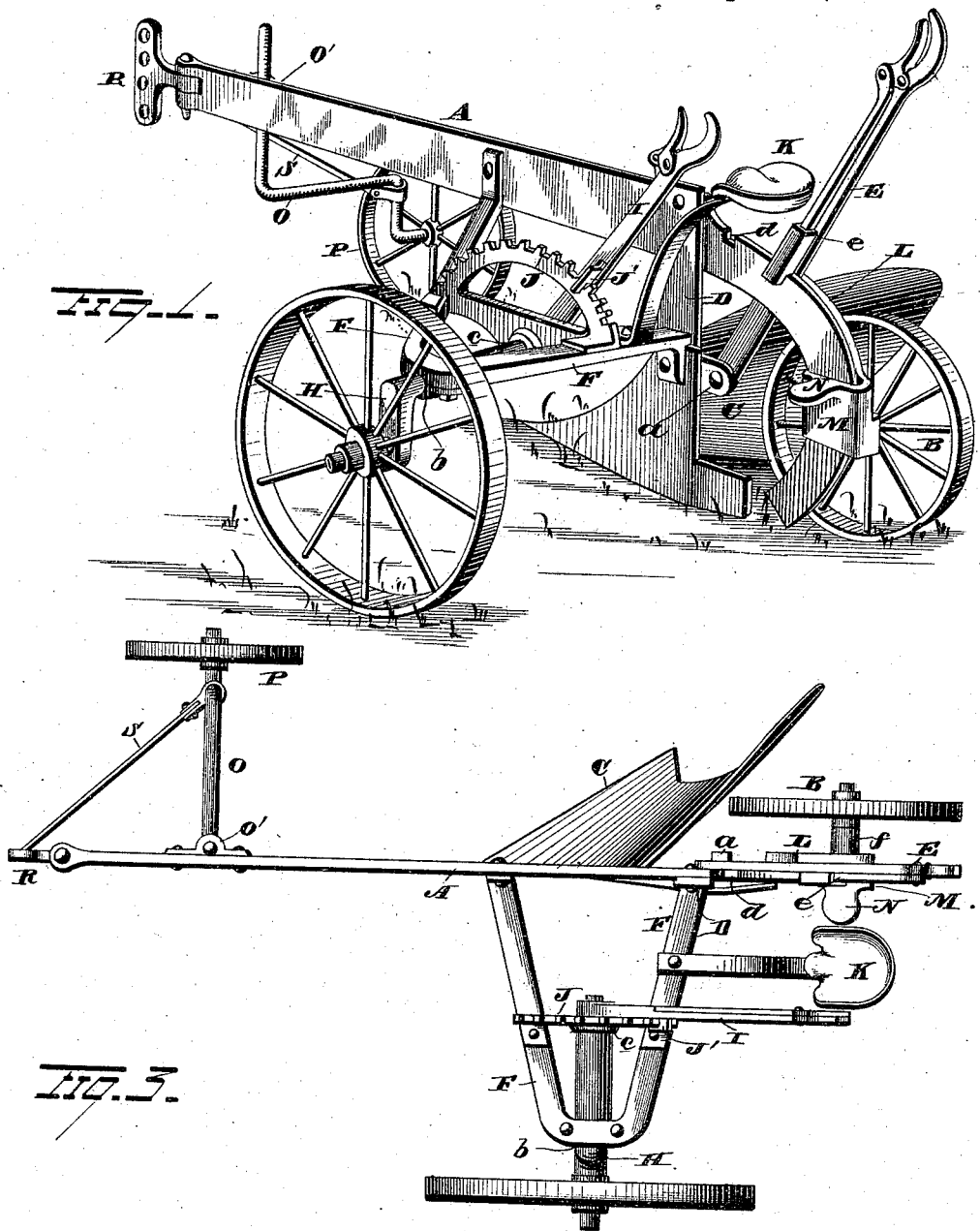

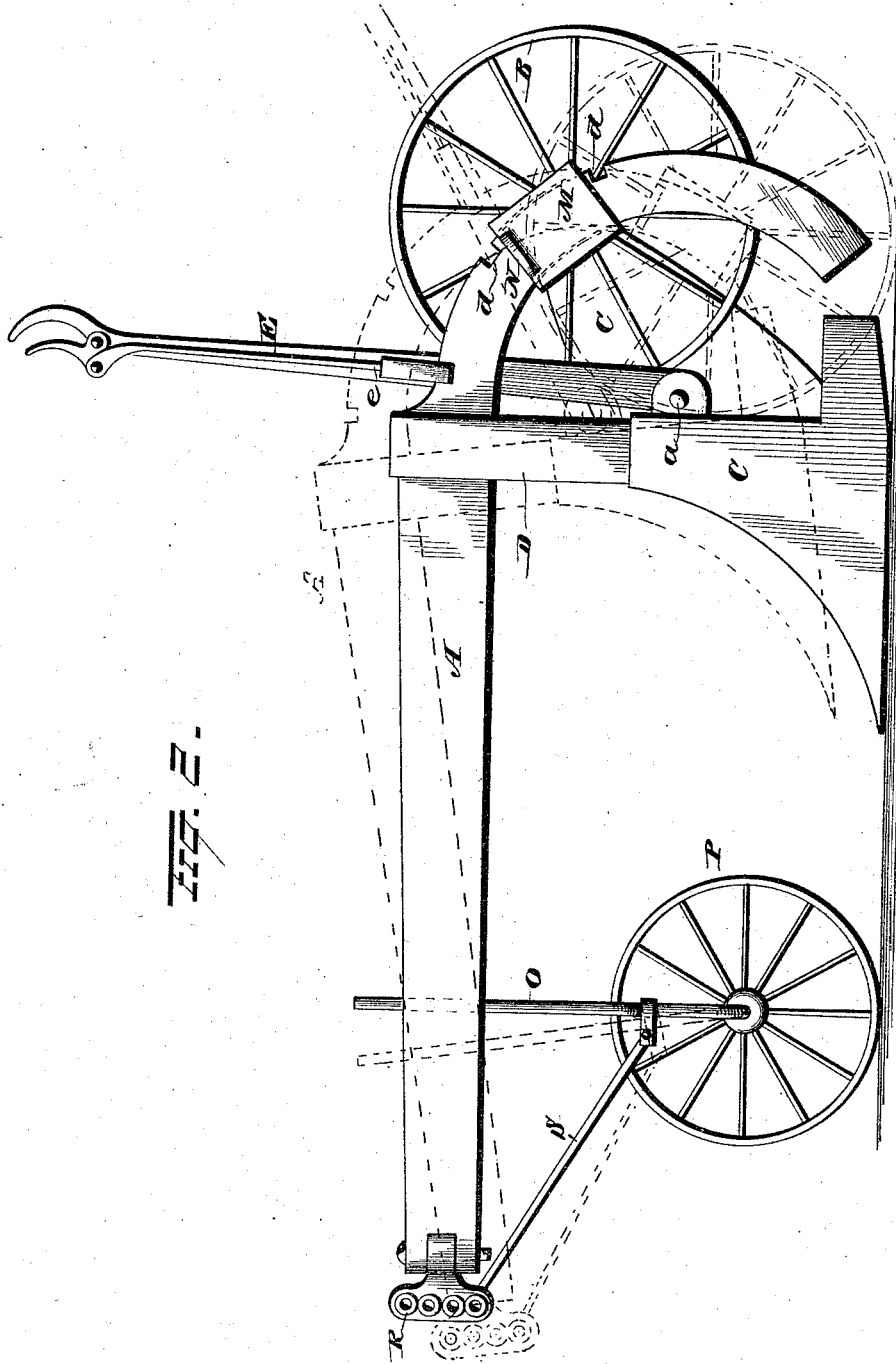

JAMES R. ERVIN, OF MARSHALL, MISSOURI.

SULKY-PLOW.

SPECIFICATION forming part of Letters Patent No. 305,441, dated September 23, 1884.

Application filed March 4, 1884. (No model.)

*To all whom it may concern:*

Be it known that I, JAMES R. ERVIN, of Marshall, in the county of Saline and State of Missouri, have invented certain new and useful Improvements in Sulky-Plows; and I do hereby declare the following to be a full, clear, and exact description of the invention, such as will enable others skilled in the art to which it appertains to make and use the same.

My invention relates to an improvement in sulky-plows, the object of the same being to provide means whereby the sulky can be turned while the plow is in the ground without danger of breaking or injuring any of the parts. A further object is to provide a comparatively cheap plow that will combine simplicity and economy in construction with durability and efficiency in use; and with these ends in view it consists of a plow-beam the rear end of which is curved downwardly in the arc of a circle, and a slide or sleeve adjustable on said curved end of the beam, and provided with a spindle, to which a furrow-wheel is secured.

My invention further consists in the parts and combinations of parts, as will be more fully described, and pointed out in the claims.

In the accompanying drawings, Figure 1 is a view in perspective taken from the rear of the machine, and showing the furrow-wheel in position for supporting the plow while at work. Fig. 2 is a view in side elevation of the machine, showing the furrow-wheel in its elevated position; and Fig. 3 is a plan view of the same.

A represents a plow-beam, preferably made of metal, the rear end of which is curved downwardly in the arc of a circle, and forms a support for the furrow-wheel B, which latter travels in the furrow immediately behind the plow C. This plow C is secured by its standard D to the plow-beam A immediately in front of the curved portion thereof, and the standard is provided with a rearwardly-projecting stud, a, to which the lever E, for elevating and lowering the furrow-wheel, is pivoted.

F is a V-shaped metallic frame, the free ends of which are flanged and secured, respectively, to the beam and plow-standard. This frame is provided at its outer end with a bearing, b, and at or near its center with a bearing, c, which, combined, support the crank-axle H. The free end of the crank passes through the bearing b for the attachment of the operating-lever I, by means of which the axle can be turned to elevate or lower the plow, as necessity demands. The frame F is provided immediately over the bearing b with the toothed sector J, with which the spring-actuated dog J' of the lever I engages, for the purpose of holding the axle in any adjustment. The rear member or arm of the frame F supports the driver's seat K, which latter is in close proximity to both levers, so as to enable the driver to elevate and lower the frame and beam without leaving his seat. The rear end of the beam curves downwardly in the arc of a circle, and the extreme lower or rear end thereof comes in close contact to the rear face of the plow. The convexed surface of the beam is provided with notches $d$, with which the spring-actuated dog $e$ of the lever E engages for the purpose of holding the furrow-wheel rigidly in position. The lever E is provided with the rearwardly and downwardly curved arm L, to which the sleeve M, which supports the furrow-wheel, is secured. This sleeve embraces the curved end of the beam, and is free to move thereon simultaneously with the lever E, to which it is secured, and is provided on its outer face with a laterally-projecting spindle, $f$, to which the furrow-wheel is journaled, and on its inner face with a laterally-projecting step, N, on which the driver steps while lowering the furrow-wheel and elevating the plow. The lever E is provided with a spring-actuated dog, $e$, which latter engages the notches on the convexed face of the beam and rigidly holds the furrow-wheel in position.

In this style of machine it is necessary that the furrow-wheel have three adjustments, in one of which the lower edge of the furrow-wheel comes in the same plane with the lower edge of the plow and assists in supporting the plow while at work. In another adjustment the furrow-wheel rests below the lower edge of the plow and holds the latter above ground, and in the third the furrow-wheel is elevated above the lower edge of the plow and above the furrow, so as to enable the plow to turn without being elevated and without damaging the parts, as it would necessarily do if the furrow-wheel could not be elevated sufficiently high to ride over the surface of the ground.

When it is desired to elevate the plow or lower the furrow-wheel, the driver takes the whole or a portion of his weight from off the plow by stepping onto the step N, after which he elevates the plow by pressing down on the lever E, the front end of which is, as before stated, pivotally secured in plow-standard. When the furrow-wheel is in a depressed or lowered position, it rests close up under the plow and sustains the greater portion of the weight of the frame and plow.

In the present instance the lever E is connected to the sleeve M by a rigid arm; but it is evident that a loose link could connect the parts and answer all purposes. This sleeve is cored out, so as to conform to the contour of the curved portion of the beam, and is made sufficiently long to prevent it from binding.

While plowing, the furrow-wheel is dropped until the dog of the lever E engages the central notches on the curved portion of the beam A. This brings the lower edge of the furrow-wheel on a line with the lower edge of the plow, and assists materially in supporting the weight of the frame and beam, and also assists in preventing the plow from sinking below a predetermined distance. When the end of the furrow is reached and it is desired to turn, the furrow-wheel is elevated, as before described, until it rests above the surface of the ground. By turning the team the plow forms the pivot on which the machine turns, while the land-wheel moves back toward the furrow just completed.

When it is desired to transport the plow from field to field, the furrow-wheel is lowered until the dog of the lever E engages the lowest notch on the curved portion of the beam. This brings the plow above the surface of the ground and enables the machine to be transported with ease.

The front end of the beam is supported on the bent standard O, which latter is vertically adjustable in the clamp or collar O', secured to one side of the beam. This standard is provided at its lower end with a spindle, on which is journaled the wheel P, which latter travels in the furrow and guides the front end of the beam, and also assists the furrow-wheel in preventing the plow from penetrating the earth beyond a predetermined point. This standard O is connected to the clevis R by the arm or brace S, by means of which latter the wheel P is turned by the team.

In the drawings I have shown the beam made of a single piece of metal; but I would have it understood that the beam can be made of metal and wood, the front part being of wood and curved portion of metal.

It is also evident that other slight changes in the construction and relative arrangement of the several parts might be resorted to without departing from the spirit of my invention, and hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. The combination, with a plow-beam the rear end of which is curved or bent downwardly, of a furrow-wheel adjustably secured to said curved or bent end.

2. In a sulky-plow, the combination, with a plow-beam the rear end of which is curved, of a sleeve vertically adjustable on the curved portion of the beam, and a furrow-wheel journaled to the sleeve, substantially as set forth.

3. In a sulky-plow, the combination, with a plow-beam the rear end of which is curved downwardly in the arc of a circle, of a sleeve vertically adjustable on said curved portion of the beam, a spindle secured to the sleeve, and a lever pivoted to the standard and connected to the sleeve, substantially as set forth.

4. In a sulky-plow, the combination, with a plow-beam having a curved rear end, and a plow secured to the beam in front of the curved portion thereof, of a sleeve vertically adjustable on the curved portion of the beam, a step secured to the sleeve, and a lever for moving the sleeve, substantially as set forth.

5. The combination, with the plow-beam skeleton frame, a crank-shaft journaled in the skeleton frame, and a land-wheel journaled on the crank-shaft, of the furrow-wheel vertically adjustable in the arc of a circle, and a lever for adjusting the wheel.

In testimony whereof I have signed this specification in the presence of two subscribing witnesses.

JAMES R. ERVIN.

Witnesses:
 C. S. DRURY,
 S. G. NOTTINGHAM.